(12) United States Patent
Matsunaga

(10) Patent No.: US 10,569,135 B2
(45) Date of Patent: Feb. 25, 2020

(54) ANALYSIS DEVICE, RECORDING MEDIUM, AND ANALYSIS METHOD

(71) Applicant: SONY CORPORATION, Tokyo (JP)

(72) Inventor: Hideyuki Matsunaga, Kanagawa (JP)

(73) Assignee: SONY CORPORATION, Tokyo (JP)

(*) Notice: Subject to any disclaimer, the term of this patent is extended or adjusted under 35 U.S.C. 154(b) by 912 days.

(21) Appl. No.: 15/104,680

(22) PCT Filed: Nov. 6, 2014

(86) PCT No.: PCT/JP2014/079387
§ 371 (c)(1),
(2) Date: Jun. 15, 2016

(87) PCT Pub. No.: WO2015/098302
PCT Pub. Date: Jul. 2, 2015

(65) Prior Publication Data
US 2016/0310788 A1    Oct. 27, 2016

(30) Foreign Application Priority Data
Dec. 27, 2013  (JP) ................................ 2013-273517

(51) Int. Cl.
*A63B 24/00*     (2006.01)
*A63B 60/46*     (2015.01)

(52) U.S. Cl.
CPC ...... *A63B 24/0006* (2013.01); *A63B 24/0062* (2013.01); *A63B 60/46* (2015.10); *A63B 2220/12* (2013.01); *A63B 2220/40* (2013.01); *A63B 2220/64* (2013.01); *A63B 2220/72* (2013.01); *A63B 2220/75* (2013.01);
(Continued)

(58) Field of Classification Search
None
See application file for complete search history.

(56) References Cited

U.S. PATENT DOCUMENTS

| 2002/0041284 A1* | 4/2002 | Konishi | A63B 24/0003 345/473 |
| 2009/0141941 A1* | 6/2009 | Wagg | G06T 7/75 382/103 |

(Continued)

FOREIGN PATENT DOCUMENTS

| JP | 2012-510876 A | 5/2012 |
| JP | 2012-254205 A | 12/2012 |

OTHER PUBLICATIONS

Damien Connaghan et al., "Toward Next Generation Coaching Tools for Court Based Racquet Sports", In: ACM Multimedia, Oct. 29-Nov. 2, 2012, Nara, Japan, 2012, pp. 4.

(Continued)

*Primary Examiner* — Tramar Y Harper
(74) *Attorney, Agent, or Firm* — Chip Law Group

(57) ABSTRACT

Provided is an analysis device, including a processor that implements an acquisition function of acquiring data indicating play events that are defined based on motions when a plurality of users play a sport and arranged in a time interval, a calculation function of calculating a degree of correlation of plays of the plurality of users in the interval based on a temporal relation of the play events of the plurality of users, and a relation estimation function of estimating a relation of the plurality of users in the interval based on the degree of correlation.

16 Claims, 10 Drawing Sheets

(52) U.S. Cl.
CPC ... *A63B 2220/803* (2013.01); *A63B 2220/805* (2013.01); *A63B 2220/807* (2013.01); *A63B 2220/833* (2013.01); *A63B 2220/836* (2013.01); *A63B 2220/89* (2013.01); *A63B 2225/50* (2013.01)

(56) References Cited

U.S. PATENT DOCUMENTS

| | | | | |
|---|---|---|---|---|
| 2010/0184563 | A1* | 7/2010 | Molyneux | A43B 1/0054 482/1 |
| 2010/0281108 | A1* | 11/2010 | Cohen | H04N 21/235 709/203 |
| 2012/0277890 | A1 | 1/2012 | Han | |
| 2012/0029666 | A1* | 2/2012 | Crowley | A63B 24/0062 700/91 |
| 2012/0212505 | A1* | 8/2012 | Burroughs | G06F 19/3481 345/629 |
| 2013/0053190 | A1 | 2/2013 | Mettler | |
| 2013/0053990 | A1* | 2/2013 | Ackland | G06Q 30/02 700/91 |
| 2014/0047457 | A1* | 2/2014 | Nojima | G09B 19/0038 719/313 |
| 2014/0303759 | A1* | 10/2014 | Hohteri | G09B 19/0038 700/91 |

OTHER PUBLICATIONS

Damien Connaghan et al., "Toward Next Generation Coaching Tools for Court Based Racquet Sports", In: ACM Multimedia, Oct. 29-Nov. 2, 2012, Nara, Japan, Nov. 26, 2012, pp. 1089-1092.

* cited by examiner

FIG.6
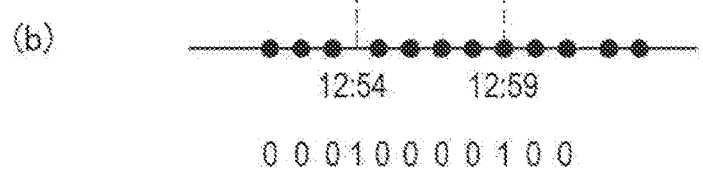
(a)
(b)
(c)
(d)

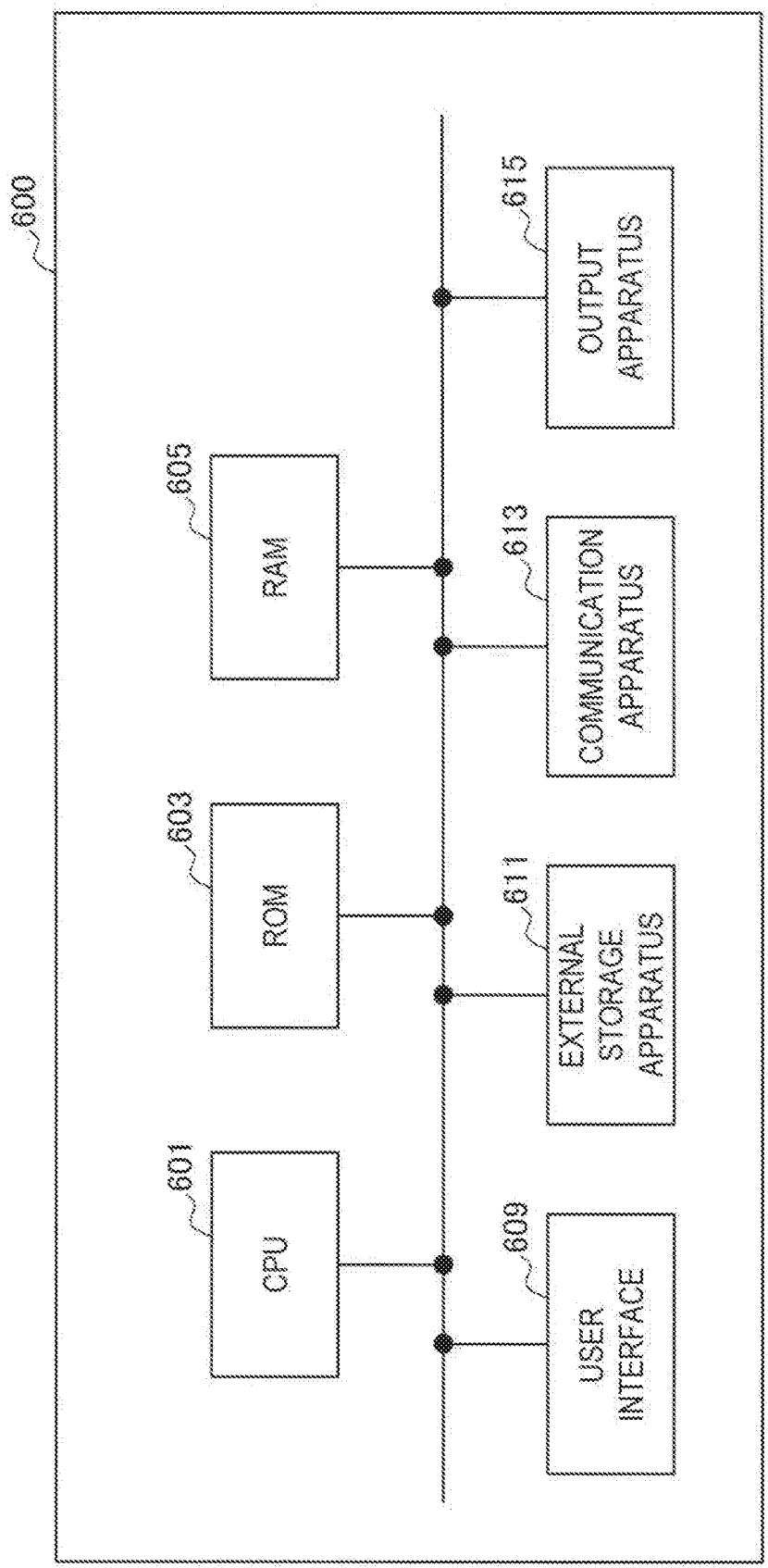

ANALYSIS DEVICE, RECORDING MEDIUM, AND ANALYSIS METHOD

CROSS REFERENCE TO RELATED APPLICATIONS

This application is a U.S. National Phase of International Patent Application No. PCT/JP2014/079387 filed on Nov. 6, 2014, which claims priority benefit of Japanese Patent Application No. JP 2013-273517 filed in the Japan Patent Office on Dec. 27, 2013. Each of the above-referenced applications is hereby incorporated herein by reference in its entirety.

TECHNICAL FIELD

The present disclosure relates to an analysis device, a recording medium, and an analysis method.

BACKGROUND ART

Techniques of assisting with a sports play using sensing or analysis have already been developed. For example, Patent Literature 1 discloses a technique of detecting a swing motion using detection data of a motion sensor, extracting data in which a swing motion is detected as swing candidate data, and selecting true swing data from swing candidate data based on a determination condition associated with a swing. Thus, for example, the user need not support a start timing and an end timing of a swing motion, and it is possible to extract swing data with a relatively small computational load.

CITATION LIST

Patent Literature

Patent Literature 1: JP 2012-254205A

SUMMARY OF INVENTION

Technical Problem

However, in the technique disclosed in Patent Literature 1, it is possible to analyze an individual swing, but acquired data is not analyzed as a series or a set. In order to improve in a sports play, it is important to analyze an individual play such as a swing and find points for improvement, but, for example, a series of plays configuring a game or a set are interrelated, and even if an individual play is focused on, influence of plays before and after it is unignorable. Further, it is difficult to understand a game or a combination of plays unless data acquired from a series of plays is analyzed as a series or a set.

In this regard, the present disclosure proposes an analysis device, a recording medium, and an analysis method, which are novel and improved and capable of analyzing data obtained from a series of sports plays as a series or a set.

Solution to Problem

According to the present disclosure, there is provided an analysis device, including: a processor configured to implement an acquisition function of acquiring data indicating play events that are defined based on motions when a plurality of users play a sport and arranged in a time interval, a calculation function of calculating a degree of correlation of plays of the plurality of users in the interval based on a temporal relation of the play events of the plurality of users, and a relation estimation function of estimating a relation of the plurality of users in the interval based on the degree of correlation.

According to the present disclosure, there is provided a recording medium having a program recorded thereon, the program causing a computer to implement: an acquisition function of acquiring data indicating play events that are defined based on motions when a plurality of users play a sport and arranged in a time interval; a calculation function of calculating a degree of correlation of plays of the plurality of users in the interval based on a temporal relation of the play events of the plurality of users; and a relation estimation function of estimating a relation of the plurality of users in the interval based on the degree of correlation.

According to the present disclosure, there is provided an analysis method, including: acquiring, by a processor, data indicating play events that are defined based on motions when a plurality of users play a sport and arranged in a time interval; calculating, by the processor, a degree of correlation of plays of the plurality of users in the interval based on a temporal relation of the play events of the plurality of users; and estimating, by the processor, a relation of the plurality of users in the interval based on the degree of correlation.

Advantageous Effects of Invention

As described above, according to the present disclosure, it is possible to analyze data obtained from a series of sports plays as a series or a set.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 6 is a diagram for describing an analysis process according to the first embodiment of the present disclosure.

FIG. 10 is a diagram illustrating an example of a hardware configuration of an analysis apparatus according to an embodiment of the present disclosure.

DESCRIPTION OF EMBODIMENTS

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

The description will proceed in the following order.
1. First embodiment
1-1. System configuration
1-1. Overview of analysis process
1-2. Functional configuration
1-3. Process flow
2. Second embodiment
3. Hardware configuration
4. Supplement The following description will proceed with a specific example of sports (tennis), but an application range of the present technology is not limited to the sports described below. For example, the present technology can be applied to any sport as long as a play event is defined based on a motion of the user who plays the sport.

1. First Embodiment (1-1. System Configuration)

Figure 1:
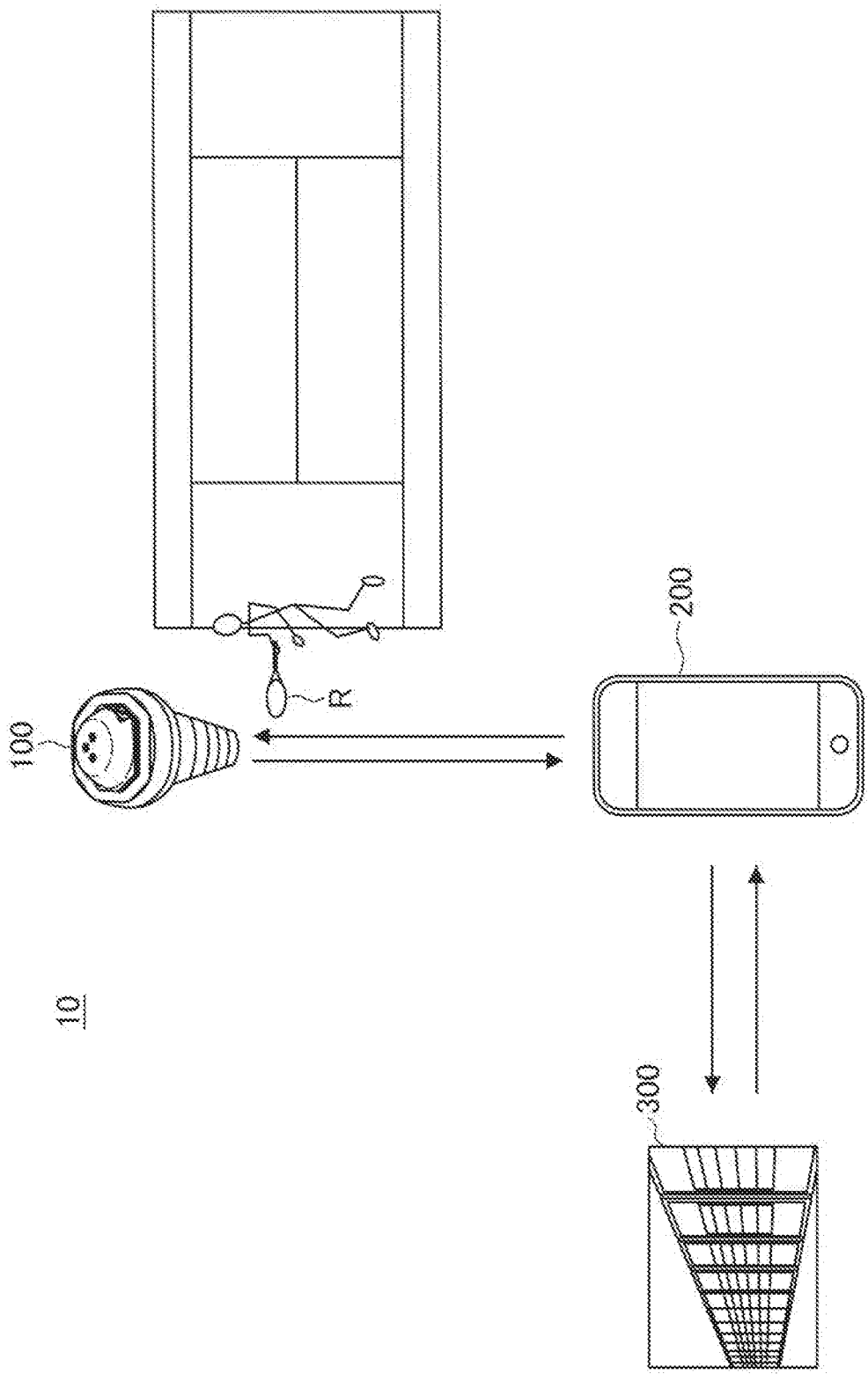
FIG. 1 is a diagram illustrating an example of a system configuration according to a first embodiment of the present disclosure.

FIG. 1 is a figure which shows an example of a system configuration according to a first embodiment of the present disclosure. With reference to FIG. 1, the system 10 includes a sensor apparatus 100, a smart phone 200, and a server 300.

The sensor apparatus 100 is mounted in a tennis racket R. The sensor apparatus 100 includes, for example, a motion sensor (for example, an acceleration sensor, a gyro sensor, a geomagnetic sensor, or the like). In this case, the sensor apparatus 100 directly detects a motion of the racket R, but since the racket R is gripped by the user and moves according to the user's intention, it can be said that the sensor apparatus 100 detects the motion of the user indirectly through the motion of the racket R. In the present disclosure, in this case, it can be said that the sensor apparatus 100 is indirectly mounted on the user and detects the motion of the user.

In another embodiment, the sensor apparatus 100 may be mounted, for example, on clothing or a shoe of the user. In this case, the sensor apparatus 100 directly detects a motion of the clothing or the shoe, but since the clothing or the shoe moves with the user, it can be said that the sensor apparatus indirectly detects the motion of the user. Alternatively, the sensor apparatus 100 may be directly mounted on the user and, for example, may be put around an arm in a band form. In this case, the sensor apparatus 100 directly detects the motion of the user. In addition to when the sensor apparatus 100 directly detects the motion of the user, even when the sensor apparatus 100 indirectly detects the motion of the user, it is possible to define a play event corresponding to the motion of the user who plays a sport based on a detection result provided by the sensor apparatus 100 as long as the motion of the user is reflected in the detected motion.

The sensor apparatus 100 may further include a vibration sensor. For example, intervals (for example, intervals before and after an impact on a ball) corresponding to a play event can be easily specified based on data detected by the vibration sensor. Further, the data detected by the vibration sensor may be used for analysis of a play event as well, similarly to the data detected by the motion sensor. The sensor apparatus 100 may further include a sensor that acquires environmental information of the user who plays a sport such as a temperature, moisture, brightness, or a position. The data detected by various kinds of sensors with which the sensor apparatus 100 is equipped is preprocessed as necessary and then transmitted to the smart phone 200 through wireless communication such as Bluetooth (a registered trademark).

For example, the smart phone 200 is arranged near the user who is playing a sport. In this case, the smart phone 200 receives the data transmitted from the sensor apparatus 100 through wireless communication such as Bluetooth (a registered trademark), temporarily accumulates or processes the received data as necessary, and transmits the resulting data to the server 300 through network communication. The smart phone 200 may receive a result of analysis performed by the server 300 based on the transmitted data and output the analysis result to the user through a display, a speaker, or the like. The analysis result may be output when the user is not playing a sport. The output of the analysis result may be performed by an information processing terminal used by the user such as a personal computer or a tablet terminal, a game machine, a television, or the like, separately from the smart phone 200.

The smart phone 200 may not necessarily be arranged near the user who is playing a sport. In this case, the sensor apparatus 100 accumulates the detected data in an internal storage region (a memory or an external storage device). For example, the data may be transmitted from the sensor apparatus 100 to the smart phone 200 through wireless communication such as Bluetooth (a registered trademark) when the sensor apparatus 100 and the smart phone 200 approach each other after the sports play. Alternatively, the data may be transmitted when the sensor apparatus 100 is connected with the smart phone 200 in a wired manner such as USB after the sports play. Further, a removable recording medium may be used for the data transfer from the sensor apparatus 100 to the smart phone 200.

The server 300 communicates with the smart phone 200 via network, and receives the data detected by various kinds of sensors with which the sensor apparatus 100 is equipped. The server 300 performs an analysis process using the received data, and generates various information related to a sports play. For example, the server 300 defines a play event based on data that directly or indirectly indicates the motion of the user who plays a sport and is acquired by the motion sensor. For example, the play event corresponds to a single shot using the racket R. By defining the play event, for example, it is possible to understand plays of the user indicated by motion data as a sequence of plays having a meaning such as {serve, stroke, volley, . . . }.

Further, the server 300 may calculate a degree of correlation of plays of a plurality of users in a predetermined time interval based on a temporal relation of play events of the plurality of users and calculate a relation of the plurality of users in the corresponding interval based on the degree of correlation. For example, information generated by the analysis process of the server 300 is transmitted to the smart phone 200 and output toward the user through the display or the speaker of the smart phone 200. Alternatively, the server 300 may transmit the information to an information processing terminal other than the smart phone 200 and output the information toward the user. The server 300 may perform the analysis process based on data received for each of a plurality of users, generate information based on a result of comparing, for example, play patterns generated for each user, and transmit the generated information to the information processing terminal of each user.

Figure 2:
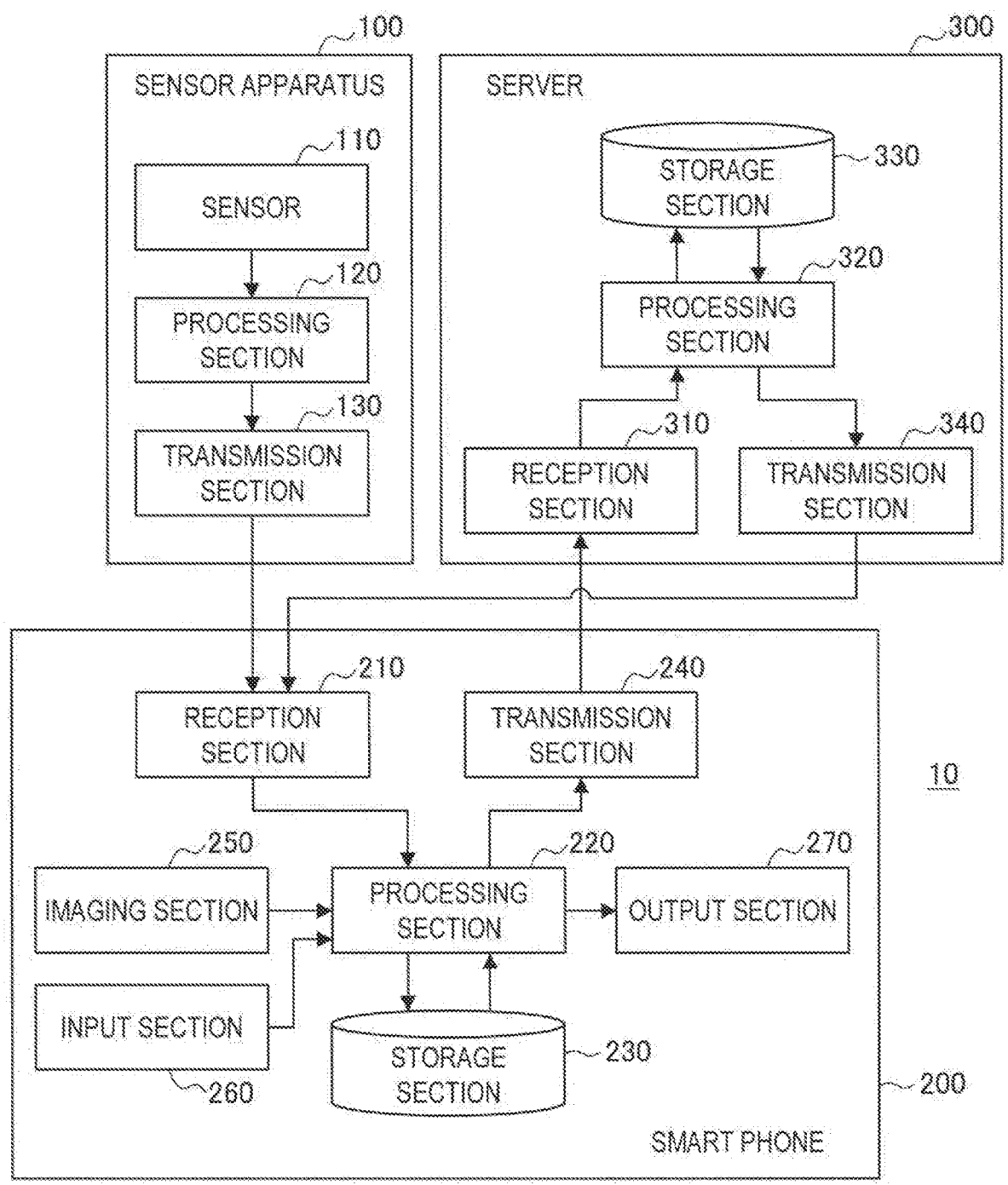
FIG. 2 is a block diagram schematically illustrating a device configuration of a system according to the first embodiment of the present disclosure.

FIG. 2 is a block diagram schematically illustrating a device configuration of a system according to the first embodiment of the present disclosure. Referring to FIG. 2, the sensor apparatus 100 includes a sensor 110, a processing section 120, and a transmission section 130. The smart phone 200 includes a reception section 210, a processing section 220, a storage section 230, a transmission section 240, an imaging section 250, an input section 260, and an output section 270. The server 300 includes a reception section 310, a processing section 320, a storage section 330, and a transmission section 340. Hardware configuration examples (hardware configuration examples of the sensor apparatus and the analysis device and the analysis device) for implementing the respective devices will be described later.

In the sensor apparatus 100, the processing section 120 processes the data acquired by the sensor 110, and the transmission section 130 transmits the processed data to the smart phone 200. The sensor 110 includes, for example, the motion sensor that directly or indirectly detects the motion of the user who plays the sport as described above. The sensor 110 may further include the vibration sensor, a sensor for acquiring the environmental information of the user, or the like. The processing section 120 is implemented by a processor that operates according to a program, and performs preprocessing on the data acquired by the sensor 110 as necessary. The preprocessing may include, for example, sampling, noise reduction, or the like. The preprocessing may not necessarily be performed. The transmission section 130 is implemented by a communication device, and transmits the data to the smart phone 200, for example, using wireless communication such as Bluetooth (a registered trademark). Although not illustrated in FIG. 2, the sensor apparatus 100 may include a storage section that temporarily accumulates data.

In the smart phone 200, the reception section 210 receives the data transmitted by the sensor apparatus 100, and the transmission section 240 transmits data to the server 300. The reception section 210 and the transmission section 240 are implemented by a communication device that performs, for example, wireless communication such as Bluetooth (a registered trademark) and wired or wireless network communication. The received data is temporarily stored in the storage section 230 and then transmitted, for example, through the processing section 220. The processing section 220 may perform preprocessing on the received data. The processing section 220 is implemented by a processor that operates according to a program, and the storage section 230 is implemented by a memory or a storage. The reception section 210 may further receive information transmitted from the server 300. For example, the received information may be output toward the user from the output section 270 according to control of the processing section 220. The output section 270 includes, for example, a display or a speaker.

Further, in the smart phone 200, the imaging section 250 acquires an image. For example, the imaging section 250 is implemented by a camera module in which an imaging element is combined with an optical system such as a lens. The image may include the user who plays a sport as a subject. For example, the image acquired by the imaging section 250 is transmitted from the transmission section 240 to the server 300 together with the data received through the reception section 210. For example, the server 300 may use the image for the analysis process together with the data acquired by the sensor apparatus 100 or may embed the image in information generated by the analysis process. The input section 260 includes, for example, a touch panel, a hardware button, a microphone that receives an audio input, and/or a camera that receives a gesture input. The processing section 220 may request the server 300 to transmit information through the transmission section 240 according to a user operation acquired through the input section 260.

The server 300 includes a reception section 310, a processing section 320, a storage section 330, and a transmission section 340. The reception section 310 is implemented by a communication apparatus, and receives data transmitted by using network communication such as the internet from the smart phone 200. The processing section 320 is implemented, for example, by a processor such as a CPU, and processes the received data. For example, the processing section 320 executes an analysis process of the process of the received data, and may additionally accumulate data after analysis in the storage section 330, or may output the data via the transmission section 340. Alternatively, the processing section 320 may only execute a control of the accumulation or output of the data already analyzed in the smart phone 200 or the like.

The configuration of the system according to the first embodiment of the present disclosure has been described above. The above-described configuration is an example, and various modifications can be made in other embodiments. For example, in the above example, the analysis process using the data acquired by the sensor apparatus 100 is performed by the processing section 320 of the server 300, but the analysis process may be performed by the processing section 220 of the smart phone 200 or the processing section 120 of the sensor apparatus 100. The system 10 has been described as including the sensor apparatus 100, the smart phone 200, and the server 300, but, for example, when the processing section 220 of the smart phone 200 performs the analysis process, the system 10 may not include the server 300. Alternatively, in this case, the server 300 provides a service of storing the information obtained by the analysis process and sharing the information with the user. Further, for example, when the processing section 120 of the sensor apparatus 100 performs the analysis process, the system 10 may not include the smart phone 200 and the server 300. The sensor apparatus 100 may be, for example, a dedicated sensor apparatus mounted on the user or a tool, or a sensor module mounted in a portable information processing terminal may function as the sensor apparatus 100. Thus, the sensor apparatus 100 may be implemented in the same apparatus as the smart phone 200.

(1-1. Overview of Analysis Process)

Figure 3:
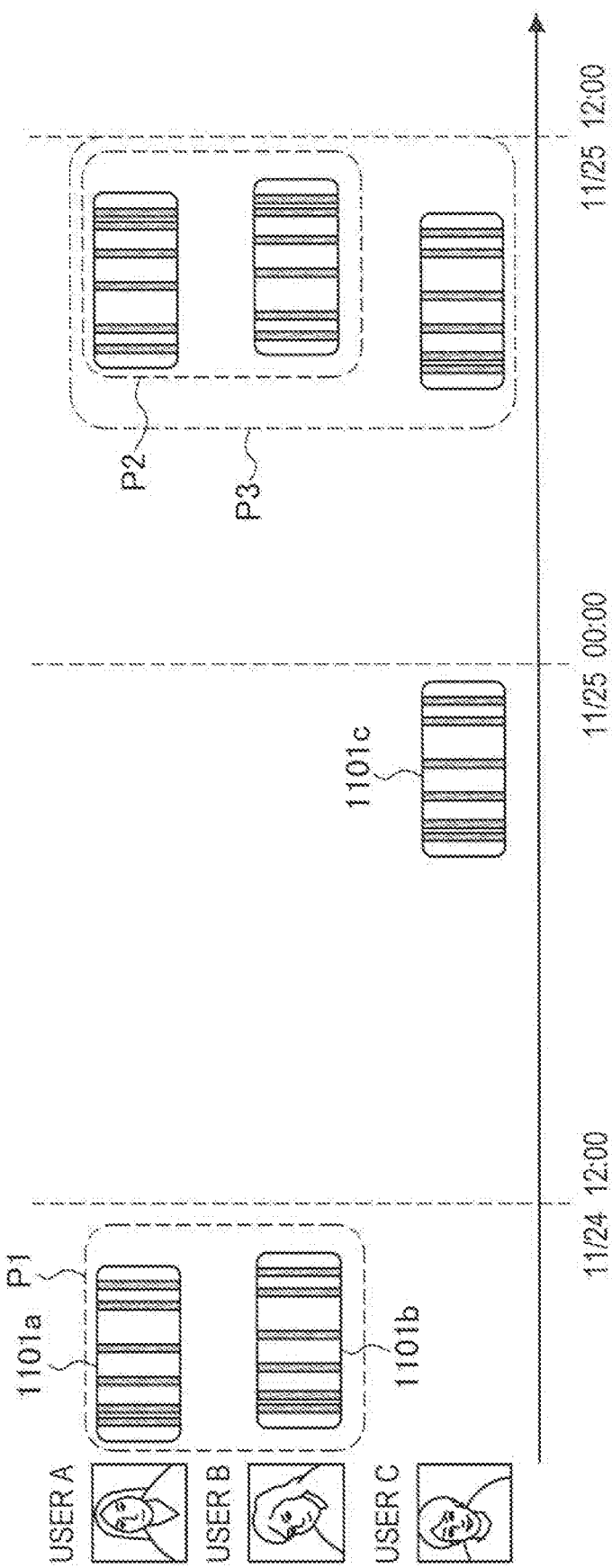
FIG. 3 is a diagram for describing an overview of an analysis process according to the first embodiment of the present disclosure.
Figure 4:
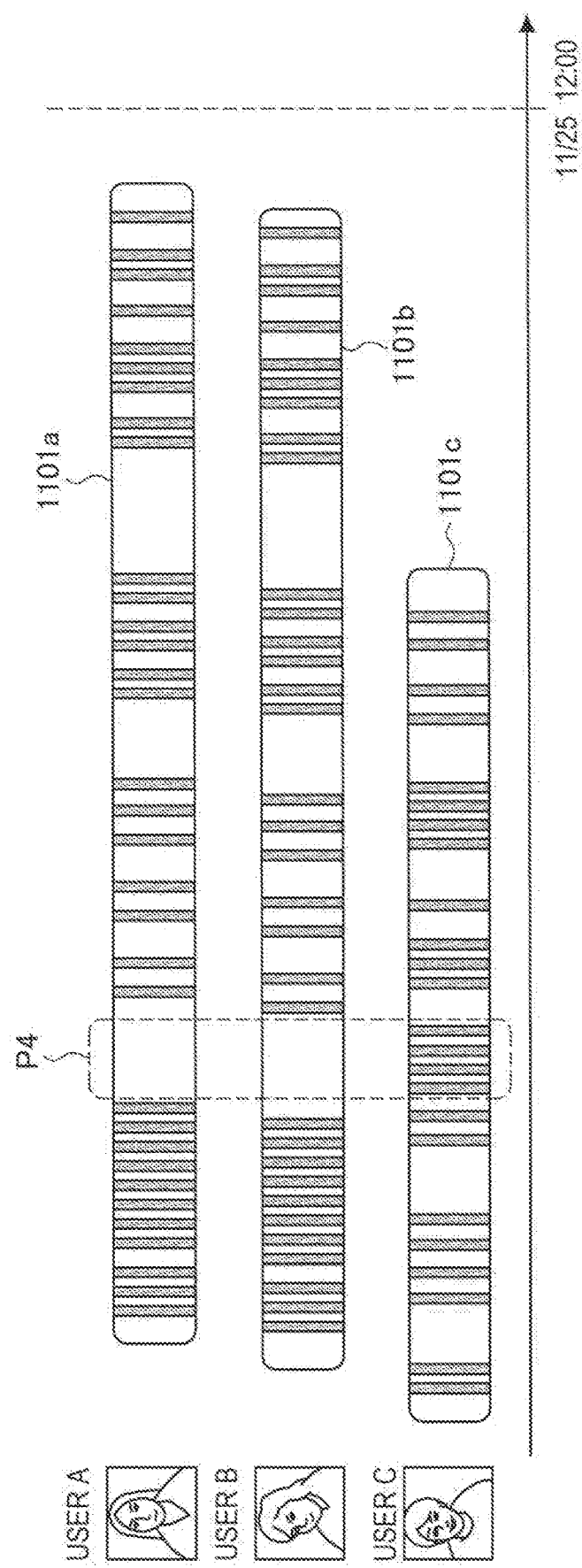
FIG. 4 is a diagram for describing an overview of an analysis process according to the first embodiment of the present disclosure.

FIGS. 3 and 4 are diagrams for describing an overview of an analysis process according to the first embodiment of the present disclosure. As illustrated in FIGS. 3 and 4, in the present embodiment, data indicating play events that are defined based on motions when a plurality of users (a user A, a user B, and a user C in the example illustrated in FIGS. 3 and 4) play a sport and arranged in a time interval is acquired. In the example illustrated in FIG. 3, a time series 1101a of play events of the user A, a time series 1101b of play events of the user B, and a time series 1101c of play events of the user C are acquired.

Here, for example, as illustrated in FIG. 3, a time interval P1 is assumed to be set. The time series 1101a and 1101b of the play events of the user A and the user B are included in the interval P1. In these time series, the play events of the user A and the user B are arranged on a time axis. In the present embodiment, for example, it is estimated that the user A and the user B play together in the interval P1 based on a temporal relation of play events of the users. In other words, in the present embodiment, it is estimated that the user A and the user B play together in the interval P1 when a predetermined temporal relation is found in the play events of the users included in the time series 1101a and 1101b of the play events of the user A and the user B in the interval P1.

In the example illustrated in FIG. 3, similarly, it is possible to estimate whether or not the user A and the user B are playing together in an interval P2 In this example, the user A and the user B are assumed to be playing together. Meanwhile, an interval P3 includes the interval P2, and includes the time series 1101c of the play events of the user C in addition to the time series 1101a and 1101b of the play events of the user A and the user B. In the present embodiment, in this case, a relation among the users in the interval P3 is estimated for three persons, that is, the user A, the user B, and the user C. For example, the user A, the user B, and the user C may be playing together, or the user A and the user B may be playing together, and the user C may be playing individually.

FIG. 4 enlargedly illustrates the time series 1101a to 1101c of the play events of the users in the interval P3 illustrated in FIG. 3. In the present embodiment, for example, the play events of the users are compared on a common time axis as described above, and the temporal relation of the play events is detected. In the example illustrated in FIG. 4, a period of time in which the play events are occurring and a period of time in which the play events are not occurring are common to the time series 1101a and 1101b of the play events. Meanwhile, in the time series 1101c of the play events, the play events occur in an interval P4 in which no play events occur in the time series 1101a and 1101b, and there is little temporal relation with the play events of the time series 1101a and 1101b. Thus, in the example illustrated in FIG. 4, it can be estimated that the user A and the user B are playing together, but the user C is playing individually.

Next, a configuration of the present embodiment for implementing the analysis process briefly described with reference to FIGS. 3 and 4 will be more specifically described.

(1-2. Functional Configuration)

Figure 5:
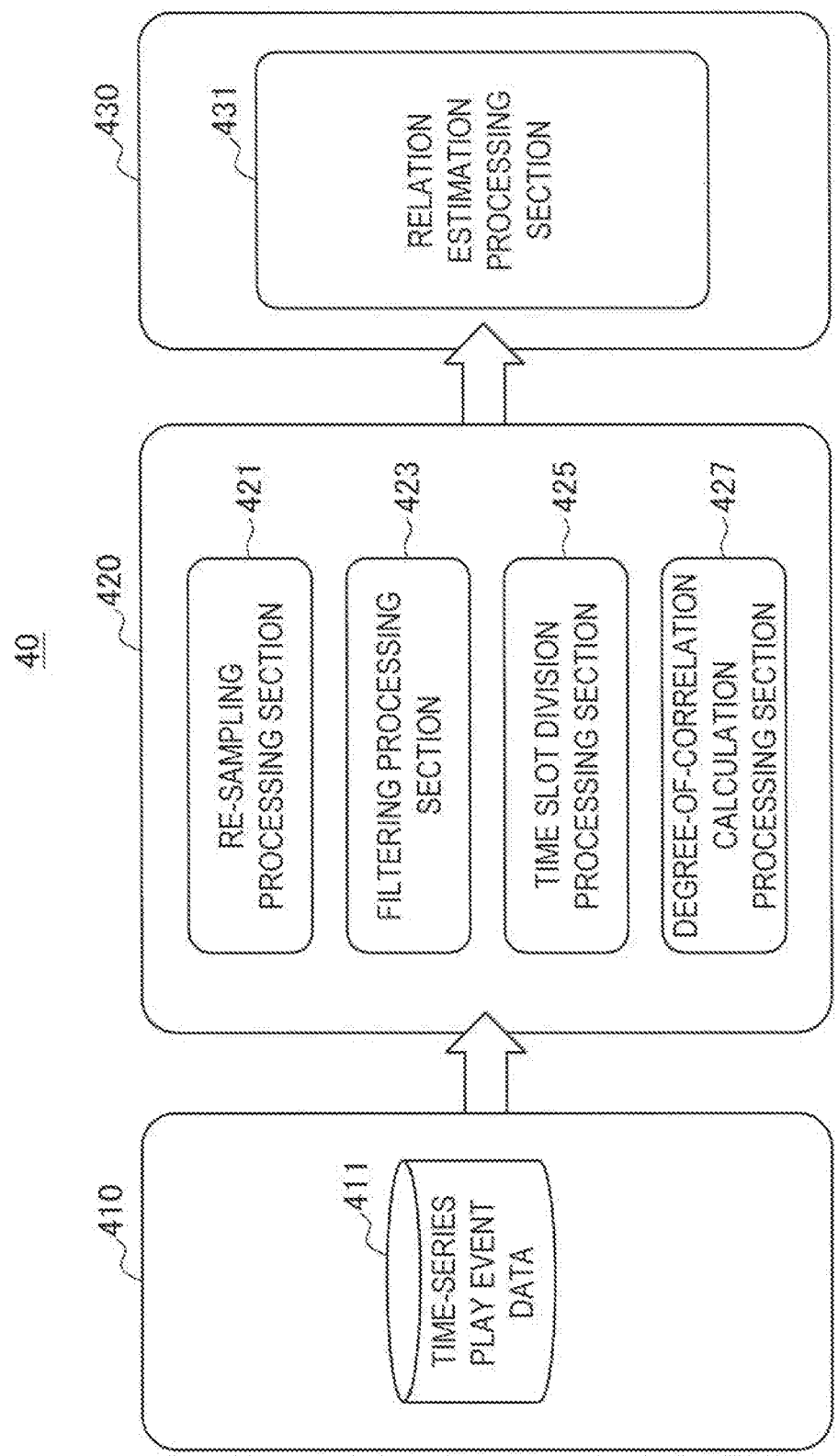
FIG. 5 is a diagram schematically illustrating a functional configuration of a processing section of a system according to the first embodiment of the present disclosure.

FIG. 5 is a diagram schematically illustrating a functional configuration of a processing section of a system according to the first embodiment of the present disclosure. Referring to FIG. 5, a processing section 40 that is implemented by a processor that performs the analysis process includes an input processing section 410, an analysis processing section 420, and an output processing section 430.

The input processing section 410 acquires time-series play event data 411. The time-series play event data 411 is data indicating play events defined based on motions when each of a plurality of users plays a sport. The time-series play event data 411 includes play events of a plurality of users that occur in a time series. In the analysis process in the analysis processing section 420 which will be described later, play events in a predetermined period of time (time interval) may be extracted from the time series and analyzed. In this case, the play events are used in the analysis process in a state in which the play events are temporally arranged in the corresponding interval (a state in which time information such as an occurrence time is held).

The analysis processing section 420 includes a re-sampling processing section 421, a filtering processing section 423, a time slot division processing section 425, and a degree-of-correlation calculation processing section 427. The analysis processing section 420 performs the analysis process using the time-series play event data 411 acquired the input processing section 410. A process performed by the respective functional components will be described below with reference to FIG. 6. FIG. 6 is a diagram for describing the analysis process according to the first embodiment of the present disclosure.

The re-sampling processing section 421 performs re-sampling based on a common time series on the acquired time-series play event data 411. For example, the time-series play event data 411 may be generated in units of generated play events as illustrated in FIG. 6(a). More specifically, for example, the time-series play event data 411 includes motion data indicating a motion of the user in the interval corresponding to an individual play event and metadata indicating a type or an attribute of the play event in association with the motion data. In this case, since the motion data is generated for each individual play event, it is necessary to arrange the motion data on a common time series. In this regard, the re-sampling processing section 421 rearranges the motion data of the respective events on the common time series, for example, using information of occurrence times of the play events included in the metadata, and performs re-sampling on the common time series at predetermined intervals. As a result, for example, the time series data indicating the play events may be converted into data in which 1 is given at the occurrence time of the event, and 0 is given at the other times as illustrated in FIG. 6(b).

Here, in the example of the time-series play event data 411 illustrated in FIG. 6(a), a character string such as FHST or SRV indicates a type of play event. In the example illustrated in FIG. 6, a play event is defined based on a motion of the user who plays tennis, and each play event corresponds to a shot in tennis. FHST indicates a forehand stroke, and SRV indicates a serve. NS (Not Swing) indicates, for example, a play event in which an impact of a racket on a ball is detected by the vibration sensor or the like, and a series of motions corresponding to an impact is also detected from motion data, but it is hard to determine whether or not a swing is a corresponding type of swing. For example, a type of play event is omitted in FIGS. 3 and 4, but a type of play event may be an analysis target in the analysis process according to the present embodiment. For example, as will be described later, when a predetermined temporal relation is found in play events of a plurality of users, if types of the play events of the users that correspond to one another in terms of time correspond to one another, a predetermined relation (in which the users are playing together or an interaction occurs, for example) may be estimated for the plurality of users. For example, in the case of tennis, when a type of play event of one user is a serve, and a play event of the other user is not a serve (users competing with each other in a match do not both serve a ball at the same time), it can be estimated that the users are playing together (competing with each other in a match), and an interaction (for example, a rally in tennis) is occurring.

The process of the re-sampling processing section 421 is not necessarily necessary when the time-series play event data 411 is indicated by the common time series. For example, when the time-series play event data 411 includes single motion data corresponding to the entire interval serving as an analysis target and a plurality of pieces of metadata designating an interval in which a play event occurs in the motion data, since the motion data is already indicated by the common time series, the re-sampling processing section 421 may not be provided.

The filtering processing section 423 filters the data that has undergone the re-sampling process performed by the re-sampling processing section 421. For example, the filtering processing section 423 removes a predetermined type of play event from the data that has undergone the re-sampling process. More specifically, for example, the filtering processing section 423 may remove the play event in which a play event type is NS (Not Swing) in FIG. 6(a) and transfer the data to a subsequent process. Further, for example, the filtering processing section 423 may perform weighting on a specific type of play event in the data that has undergone the re-sampling process.

Further, for example, the filtering processing section 423 may calculate a moving average of the data that has undergone the re-sampling process performed by the re-sampling processing section 421 and transfer data of the moving average to a subsequent process. For example, the filtering processing section 423 may calculate a moving average of data in which 1 is given at an occurrence time of an event, and 0 is given at the other times as illustrated in FIG. 6(b) and generate time series data of a waveform having expansion in intervals before and after each play event as illustrated in FIG. 6(c). Alternatively, the filtering processing section 423 may generate a waveform having expansion in intervals before and after each play event, for example, using a low pass filter, a high pass filter, or a band pass filter.

Further, for example, the filtering processing section 423 may offset the data that has undergone the re-sampling process performed by the re-sampling processing section 421 and transfer the offset data to a subsequent process. For example, when a tennis rally is performed between two users, the play events of the users occur alternately at intervals of periods of time in which a ball flies (for example, 1 second to 2 seconds). In other words, all play events of users who play together do not necessarily occur in a synchronized manner. Thus, for example, when it is possible to predict a deviation in a play event between the users having a predetermined relation (in which the users are playing together or an interaction occurs, for example), the filter processing section 423 may offset the data in terms of time. More specifically, the filtering processing section 423 may offset data of the other user forward or backward by a predetermined time based on data of one user (one user who is performing a rally in the case of tennis).

In the example of the process of the filtering processing section 423, it is possible to dull the waveform of the data by calculating the moving average of the data or using the low pass filter or the like because the waveform of the time series data has expansion in the intervals before and after the play event, and the temporal relation with the play event of the other user that has occurred with a slight time difference is easily detected. In other words, there are cases in which the process of dulling the waveform of the data and the process of offsetting the data are performed with the same purpose. Thus, there are cases in which the filtering processing section 423 need not offset the data when the waveform of the data is dull and in which it need not dull the data when the data is offset. Of course, the data may be offset and dulled.

The time slot division processing section 425 divides the interval serving as the analysis target into a plurality of time slots. For example, a time slot is a time interval having a predetermined duration such as an interval of n seconds as illustrated in FIG. 6(d). By dividing the interval serving as the analysis target into time slots and performing a degree-of-correlation calculation process (which will be described later) in each time slot, it is possible to quantitatively evaluate a correlation between plays of the users. For example, a length of a time slot may be set according to a relation between the users to be estimated. For example, when it is simply estimated whether or not the users play together (including, for example, when the users play side by side with no interaction), a time slot may be set to a relatively long period of time. On the other hand, when it is estimated whether or not an interaction between the users occurs, a time slot may be set to a relatively short period of time. Further, for example, when a degree of correlation can be calculated by a comparison of waveforms of the time series in the entire interval serving as the analysis target, the time slot division processing section 425 need not necessarily be provided.

The degree-of-correlation calculation processing section 427 calculates a degree of correlation of plays of a plurality of users in the interval serving as the analysis target. The degree of correlation is calculated based on the temporal relation of the play events of a plurality of users. In the illustrated example, since the time slot division processing section 425 divides the interval into time slots, the degree of correlation is calculated for each time slot. For example, the degree-of-correlation calculation processing section 427 calculates the degree of correlation by multiplying integral values (impulses) of the waveforms of the time series data in each time slot. When no waveform is generated in a time slot in any of the multiplied time series data, the integral value is 0. Thus, when the multiplication value of the impulses of a plurality of pieces of time series data in the time slot is not 0, the play event can be detected to have occurred in the time series data in the corresponding time slot. The degree-of-correlation calculation processing section 427 may calculate a degree of correlation of plays of a plurality of users in the interval serving as the analysis target according to a percentage of the time slot in which the correlation of the plays of the users, for example, a percentage of the time slot in which the multiplication value of the impulses, is not 0 in the above example.

When a degree of correlation is calculated based on the multiplication value of the impulses as in the above example, it is decided whether or not a correlation is found between the plays of the users according to whether or not the time slots in which the waveform occurs overlap in the time series data. Thus, it is undesirable not to calculate a degree of correlation when there is actually a correlation between the plays of the users (the users play together or an interaction occurs, for example) but the time slots in which the waveform occurs alternate with each other in the time series data. In this regard, in the present embodiment, for example, the filtering processing section 423 dulls the waveform of the data or offsets the data in terms of time using the moving average, the low pass filter, or the like, and thus the time slots in which the waveforms corresponding to the play events of the users having a correlation in the play occur easily occur. As another example, a time slot may be set to be reasonably large so that the time slots in which the waveforms corresponding to the play events of the users having a correlation in the play occur easily occur. However, in both examples, for example, when the waveform is dulled too much or the time slot is too large, a degree of correlation even for the user having no correlation in the play is likely to be calculated, and thus it is necessary to set an appropriate range.

The output processing section 430 includes a relation estimation processing section 431. The relation estimation processing section 431 estimates a relation of a plurality of users in the interval serving as the analysis target based on the degree of correlation calculated in the analysis processing section 420, and outputs an estimation result. For example, the relation estimation processing section 431 estimates whether or not a plurality of users play together. In this case, an interaction may not necessarily occur among the users, but the users are in a relation in which they are simply in the same place. For example, the users have collectivity or a certain thing in common in a sports play such as a group of users that perform the same type of practice in rotation.

Further, for example, the relation estimation processing section 431 may estimate an interaction among a plurality of users. In this case, the users play in the same place, and some interactions occur among the users as well. For example, the interaction may mean each play event occurring in a state in which the plays of the respective users influence each other such as a rally in tennis (during a match or during practice) or a play of stealing a ball in soccer. In this case, the play events of the users associated with the interaction are considered to occur in proximity to each other in terms of time. Thus, when an interaction occurs between the users, for example, in the calculation of the degree of correlation in the degree-of-correlation calculation processing section 427, a high degree of correlation may be calculated even when the time slot set by the time slot division processing section 425 is relatively small. Thus, the relation estimation processing section 431 may estimate that an interaction occurs among a plurality of users, for example, when a length of each time slot is smaller than a first threshold value, and a degree of correlation in each time slot is higher than a second threshold value. Further, the relation estimation processing section 431 may determine whether or not an interaction occurs between the users based on a type of play event occurring with a correlation (occurring in the same time slot, for example).

The output processing section 430 can also implement a function (an information provision function) of providing information based on the estimation result output by the relation estimation processing section 431 according to some or all of a plurality of users serving as the analysis target. In this case, for example, based on a request of a first user among a plurality of users, information indicating a second user (included in the plurality of users) who plays together with the first user may be provided to the first user.

As a more specific example, for example, when information of the user who plays together with the first user is requested by the first user or a service used by the first user, the input processing section 410 acquires the time-series play event data 411 of a plurality of users on whom such information can be provided (for example, friends of the first user), and performs the analysis process based on the time-series play event data 411 acquired by the analysis processing section 420. Here, the analysis processing section 420 may remove a user who is included in the time-series play event data 411 but does not overlap the first user in a time zone in which the play event occurs from the target of the analysis process. Based on the result of the analysis process, information generated by the output processing section 430 may be provided to the first user.

(1-3. Process Flow)

Figure 7:
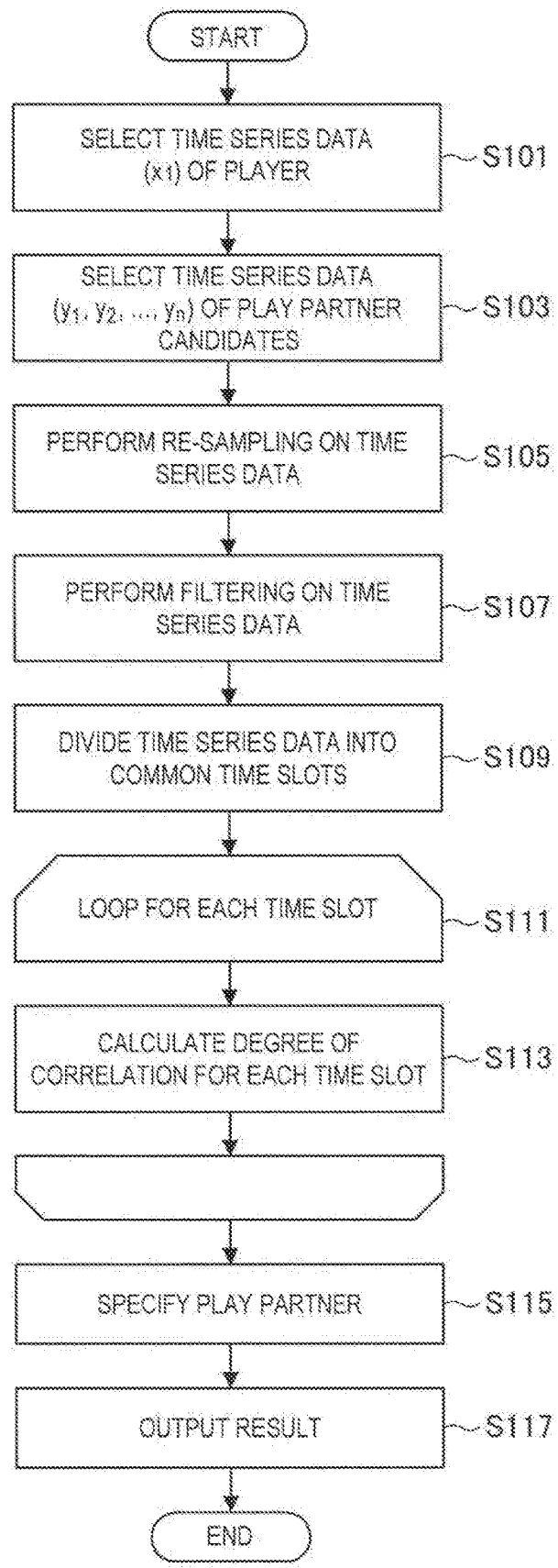
FIG. 7 is a flowchart illustrating an example of a process according to the first embodiment of the present disclosure.

FIG. 7 is a flowchart illustrating an example of a process according to the first embodiment of the present disclosure. Referring to FIG. 7, first, the input processing section 410 selects time series data $X=(x1)$ of a player (S101). Then, the input processing section 410 selects time series data $Y=(y1, y2, \ldots, yn)$ of play partner candidates (S103). Here, as in the above example, a player of X may be a user who has requested a system to transmit information of a play partner, and a player group of Y may be other users such as friends of the user (who are permitted to share information).

Then, in the analysis processing section 420, the re-sampling processing section 421 performs re-sampling on the time series data (S105). Here, the time series data X and Y is converted into $X'=(x'1)$ and $Y'=(y'1, y'2, \ldots, y'n)$. Then, the filtering processing section 423 performs filtering on the time series data X' and Y' (S107). Here, the time series data X' and Y' is converted into $X''=(x''1)$ and $Y''=(y''1, y''2, \ldots, y''n)$. Further, the time slot division processing section 425 divides the time series data X" and Y" into common time slots (S109).

Then, the degree-of-correlation calculation processing section 427 performs a loop process for each time slot (S111). Here, a degree of correlation between the time series data is calculated for each time slot (S113). More specifically, for example, in each time slot, a degree of correlation between the time series data x"1 and y"1, a degree of correlation between the time series data x"1 and y"2, . . . , and a degree of correlation between the time series data x"1 and y"n may be calculated. The relation estimation processing section 431 specifies the play partner based on the result (S115), and outputs the result (S117). For example, the relation estimation processing section 431 integrates the degrees of correlation calculated between the time series data $Y''=(y''1, y''2, \ldots, y''n)$ and the time series data x"1 in the respective time slots in S113, and uses an integration result as a degree-of-correlation score of each play partner candidate. A player having the degree-of-correlation score higher than a predetermined threshold value is specified as the play partner.

As a modification of the above example, for example, in S109, the time slot division processing section 425 may divide the time series data X" and Y" into two types of time slots having different lengths, and the degree-of-correlation calculation processing section 427 may perform the loop process of S111 on the respective time slots individually. In this case, in S115, the relation estimation processing section 431 may specify the player for whom a degree-of-correlation score higher than a threshold value is calculated in a smaller time slot among the players (the play partner candidates) of the time series data Y as the player who has an interaction (who serves a rally partner in tennis, for example) with the player of the time series data X. Further, the player for whom a degree-of-correlation score higher than a threshold value is calculated in a larger time slot among the remaining players of the time series data Y may be specified as the player who has no interaction with the player of the time series data X but plays together.

2. Second Embodiment

Next, a second embodiment of the present disclosure will be described. The second embodiment differs from the first embodiment in that a position determining section 521 to be described below is provided, but the remaining points are the same as in the first embodiment, and thus a detailed description thereof is omitted.

Figure 8:
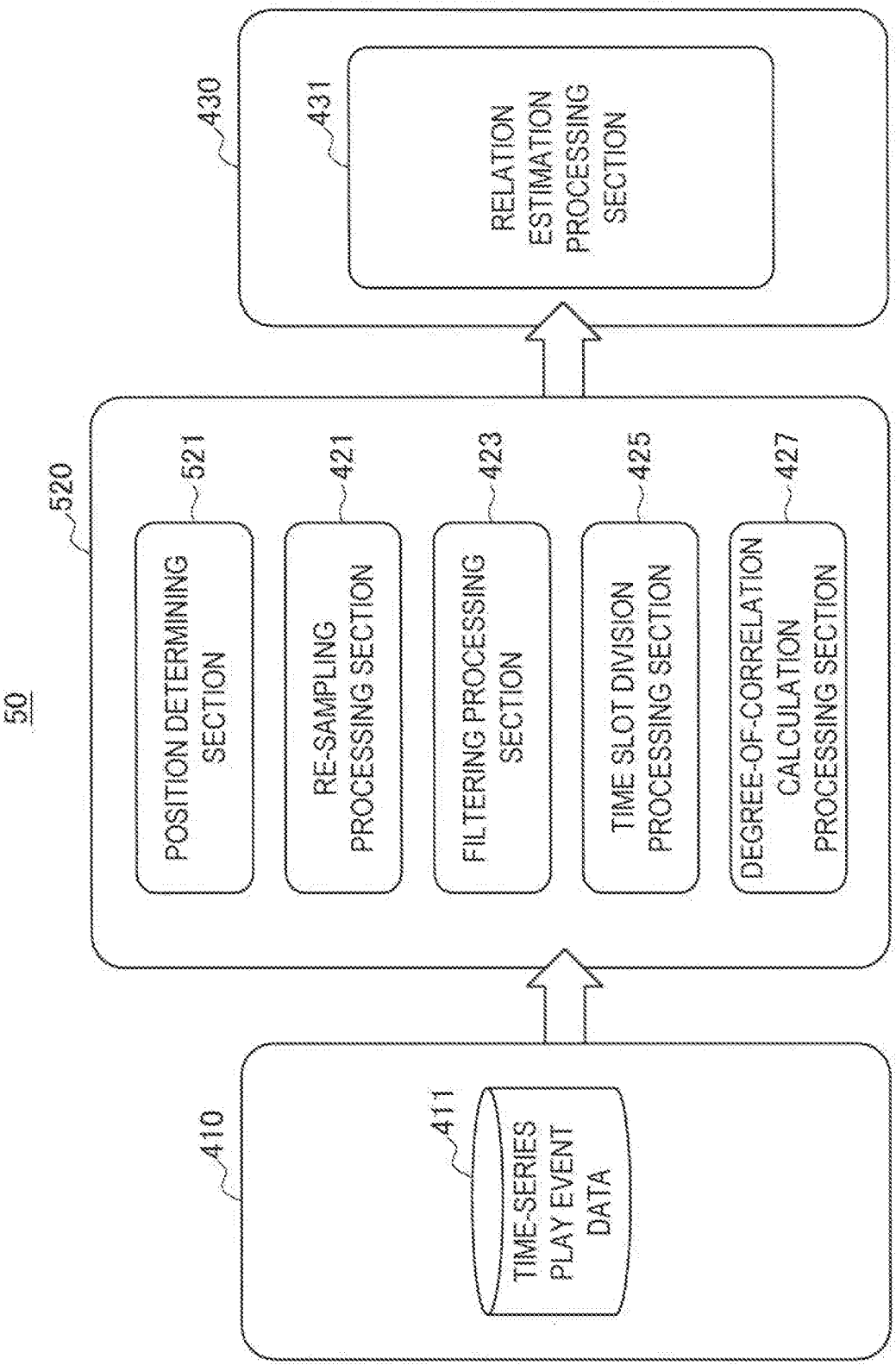
FIG. 8 is a diagram schematically illustrating a functional configuration of a processing section of a system according to a second embodiment of the present disclosure.

FIG. 8 is a diagram schematically illustrating a functional configuration of a processing section of a system according to the second embodiment of the present disclosure. Referring to FIG. 8, a processing section 50 that is implemented by the processor that performs the analysis process includes an input processing section 410, an analysis processing section 520, and an output processing section 430. The input processing section 410 and the output processing section 430 are substantially the same as those described with reference to FIG. 5.

The analysis processing section 520 includes a position determining section 521, a re-sampling processing section 421, a filtering processing section 423, a time slot division processing section 425, and a degree-of-correlation calculation processing section 427. The re-sampling processing section 421, the filtering processing section 423, the time slot division processing section 425, and the degree-of-correlation calculation processing section 427 are substantially the same as those described with reference to FIG. 5.

In the present embodiment, a sensor 110 with which a sensor apparatus 100 is equipped includes a position sensor such as a GPS sensor, or the smart phone 200 near the sensor apparatus 100 acquires position information using a GPS sensor, a Wi-Fi communication section, or the like, and thus it is possible to acquire position information indicating a place at which a play event occurs. Thus, the time-series play event data 411 acquired by the input processing section 410 may include the position information indicating a place at which a play event occurs.

The position determining section 521 extracts the user serving as a target of analysis (a calculation of a degree of correlation) in a process subsequent to the re-sampling processing section 421 based on the position information. For example, the position determining section 521 may extract another user who generates a play event at a position within a predetermined range from a position at which a play event of the user (for example, the user of the time series data X in the example of FIG. 7) who requests determination of a relation between the users occurs as the user (for example, the user of the time series data Y in the example of FIG. 7) of the analysis target.

Through such a function of the position determining section 521, for example, when the number of users included in the time-series play event data 411 is large, it is possible to remove a user (a user positioned at a long distance) who is unlikely to have a relation between the users from the analysis target and thus reduce a load of the analysis process. For example, a function of extracting the users who overlap in a time zone in which a play event occurs or the like may be performed as the same target extraction function of the position determining section 521 as well.

For example, as described above with reference to FIGS. 3 and 4, it is hard to identify the user who is at a close position but plays individually or does not play based on only the position information acquired by the position determining section 521. In the present embodiment, the position information is used for extraction of the user of the analysis target, and the motion data of the play event or the like is used for estimation of the relation (in which the users play together or an interaction occurs, for example) between the plays of the users, and thus it is possible to estimate the relation between the plays of the users with a high degree of accuracy.

Two embodiments of the present disclosure have been described above. Embodiments of the present disclosure are not limited to the above two embodiments, and various other embodiments can be made. For example, as described above, a type of sport is not limited to tennis in the above example, and, for example, an embodiment of the present disclosure can be applied to all sports such as soccer, golf, and table tennis. For example, in the case of soccer, when a time slot is set to be reasonably large, it is possible to identify a user who plays together in a pitch and a user serving as an audience outside a pitch. Further, when a time slot is set to be small, it is possible to specify a user having an interaction, for example, a user who tries to steal a ball among users who play together in a pitch.

(3. Hardware Configurations)

Next, examples of hardware configurations for implementing the sensor apparatus and the analysis apparatus (in the above described examples, the sensor apparatus, the smart phone or the server) according to an embodiment of the present disclosure will be described with reference to FIG. 9 and FIG. 10.

(Sensor Apparatus)

Figure 9:
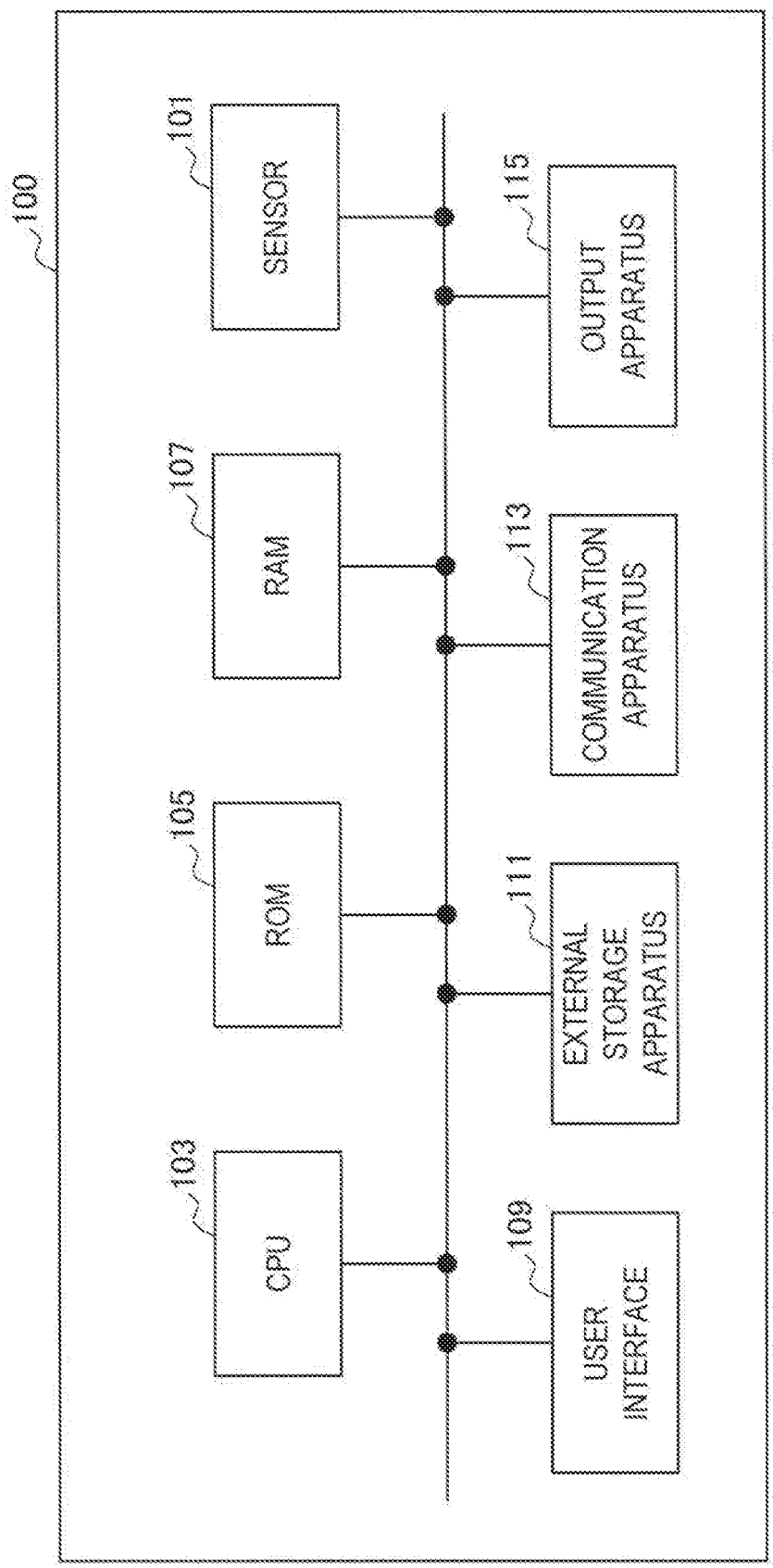
FIG. 9 is a diagram illustrating an example of a hardware configuration of a sensor apparatus according to an embodiment of the present disclosure.

FIG. 9 is a diagram illustrating an example of a hardware configuration of the sensor apparatus according to an embodiment of the present disclosure. With reference to FIG. 9, the sensor apparatus 100 may include a sensor 101, a Central Processing Unit (CPU) 103, a Read Only Memory (ROM) 105, a Random Access Memory (RAM) 107, a user interface 109, an external storage apparatus 111, a communication apparatus 113, and an output apparatus 115. These elements are mutually connected by a bus, for example.

For example, the sensor 101 includes an acceleration sensor, an angular velocity sensor, a vibration sensor, a magnetic field sensor, a temperature sensor, a pressure sensor (including a press switch), a Global Positioning System (GPS) receiver or the like. The sensor 101 may include a camera (imaging sensor) or a microphone (audio sensor).

The CPU 103, the ROM 105 and the RAM 107 implement various types of functions with software, by reading and executing program instructions, for example, recorded in the external storage apparatus 111. In the embodiments of the present disclosure, functions such as control of the entire sensor apparatus 100 may be implemented, for example, by the CPU 103, the ROM 105 and the RAM 107.

The user interface 109 is, for example, an input apparatus such as buttons or a touch panel, which receives user operations of the sensor apparatus 100. For example, operations of a user may instruct the start or completion of the transmission of sensor information from the sensor apparatus.

The external storage apparatus 111 stores various types of information related to the sensor apparatus 100. For example, program instructions for causing functions to be implemented by software in the CPU 103, the ROM 105 and RAM 107 may be stored in the external storage apparatus 111, or data acquired by the sensor 101 may be cached temporarily. When considering that the sensor apparatus 100 is mounted in a hitting tool or the like, it is desirable to use a sensor apparatus, for example, with a strong impact such as a semiconductor memory, as the external storage apparatus 111.

Further, a configuration corresponding to an internal storage region (a memory or an external storage device) that accumulates data detected in the sensor apparatus 100 when the smart phone 200 is not arranged near the user who is playing a sport is the ROM 105, the RAM 107, and/or the external storage apparatus 111.

The communication apparatus 113 communicates with the analysis apparatus 600, which will be described later, by various types of wired or wireless communication systems. Further, the communication apparatus 113 may directly communicate with the analysis apparatus 600 by inter-device communication, or may communicate with the analysis apparatus 600 via a network such as the internet.

The output apparatus 115 is constituted by an apparatus capable of outputting information as light, audio or images. For example, the output apparatus 115 may output information which notifies detection of a time or play event in the sensor apparatus 100, or may output a visual or aural notification to a user, based on an analysis result received from the analysis apparatus 600 or an analysis result calculated in the sensor apparatus 100. For example, the output apparatus 115 includes, for example, a display such as a lamp of an LED or the like or an LCD, a speaker, a vibrator or the like.

(Analysis Apparatus)

FIG. 10 is a diagram illustrating an example of a hardware configuration of the analysis apparatus according to an embodiment of the present disclosure. The analysis apparatus 600 may implement, for example, the analysis apparatus according to an embodiment of the present disclosure, or the smart phone 200 or the server 300 described above. Note that, as described above, the analysis apparatus may be implemented by the sensor apparatus 100.

The analysis apparatus 600 may include a CPU 601, a ROM 603, a RAM 605, a user interface 609, an external storage apparatus 611, a communication apparatus 613, and an output apparatus 615. These elements are mutually connected by a bus, for example.

The CPU 601, the ROM 603 and the RAM 605 implement various types of functions with software, by reading and executing program instructions, for example, recorded in the external storage apparatus 611. In the embodiments of the present disclosure, control of the entire analysis apparatus 600, functions of the processing section in the above described functional configuration or the like, may be implemented, for example, by the CPU 601, the ROM 603 and the RAM 605.

The user interface 609 is, for example, an input apparatus such as buttons or a touch panel, which receives user operations of the analysis apparatus 600.

The external storage apparatus 611 stores various types of information related to the analysis apparatus 600. For example, program instructions for causing functions to be implemented by software in the CPU 601, the ROM 603 and RAM 605 may be stored in the external storage apparatus 611, or sensor information received by the communication apparatus 613 may be cached temporarily. Further, a log of analysis results may be accumulated in the external storage apparatus 611.

The output apparatus 615 is constituted by an apparatus capable of visually or aurally notifying information to a user. For example, the output apparatus 615 may be a display device such as a Liquid Crystal Display (LCD), or an audio output device such as a speaker or headphones. The output apparatus 615 outputs a result obtained by the processes of the analysis apparatus 600 as video images such as text or pictures, or outputs the results as audio such as voices or sounds.

Heretofore, examples of the hardware configurations of the sensor apparatus 100 and the analysis apparatus 600 have been shown. Each of the above described constituent elements may be constituted by using generic members, or may be constituted by hardware specialized for the functions of each of the constituent elements. Such a configuration may be appropriately changed in accordance with the technology level at the time of implementation.

(4. Supplement)

For example, the embodiments of the present disclosure may include an analysis apparatus such as that described above (an information processing terminal such as a smart phone, a server, or a sensor apparatus), a system, an information processing method executed by the analysis apparatus or the system, a program for causing the analysis apparatus to function, and a non-temporarily tangible medium on which programs are recorded.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification. Additionally, the present technology may also be configured as below.

(1) An analysis device, including:
a processor configured to implement
an acquisition function of acquiring data indicating play events that are defined based on motions when a plurality of users play a sport and arranged in a time interval,
a calculation function of calculating a degree of correlation of plays of the plurality of users in the interval based on a temporal relation of the play events of the plurality of users, and
a relation estimation function of estimating a relation of the plurality of users in the interval based on the degree of correlation.

(2) The analysis device according to (1),
wherein the relation estimation function estimates whether or not the plurality of users play together in the interval.

(3) The analysis device according to (2),
wherein the relation estimation function estimates an interaction among the plurality of users occurring in the interval.

(4) The analysis device according to any one of (1) to (3),
wherein the calculation function divides the interval into a plurality of time slots, and calculates the degree of correlation in each of the time slots.

(5) The analysis device according to (4),
wherein the relation estimation function estimates that an interaction has occurred among the plurality of users when a length of each of the time slots is smaller than a first threshold value, and the degree of correlation in each of the time slots is higher than a second threshold value.

(6) The analysis device according to any one of (1) to (5),
wherein the calculation function performs re-sampling based on a common time series on the data and then calculates the degree of correlation.

(7) The analysis device according to (6),
wherein the calculation function filters the data that has undergone the re-sampling and then calculates the degree of correlation.

(8) The analysis device according to (7),
wherein the calculation function calculates the degree of correlation based on a moving average of the data that has undergone the re-sampling.

(9) The analysis device according to (7) or (8),
wherein the calculation function removes a predetermined type of play event from the data that has undergone the re-sampling and then calculates the degree of correlation.

(10) The analysis device according to any one of (6) to (9),
wherein the calculation function offsets the data that has undergone the re-sampling and then calculates the degree of correlation.

(11) The analysis device according to any one of (1) to (10),
wherein the processor further implements an information provision function of providing information based on the relation to some or all of the plurality of users.

(12) The analysis device according to (11),
wherein the information provision function provides information indicating a second user who plays together with a first user among the plurality of users to the first user based on a request of the first user among the plurality of users.

(13) The analysis device according to any one of (1) to (12),
wherein the processor further implements a target extraction function of extracting a user serving as a calculation target of the degree of correlation from among the plurality of users.

(14) The analysis device according to (13),
wherein the acquisition function acquires the data further including position information indicating a place at which the play event occurs, and
wherein the target extraction function extracts the user serving as the calculation target of the degree of correlation based on the position information.

(15) A recording medium having a program recorded thereon, the program causing a computer to implement:
an acquisition function of acquiring data indicating play events that are defined based on motions when a plurality of users play a sport and arranged in a time interval;
a calculation function of calculating a degree of correlation of plays of the plurality of users in the interval based on a temporal relation of the play events of the plurality of users; and
a relation estimation function of estimating a relation of the plurality of users in the interval based on the degree of correlation.

(16) An analysis method, including:
acquiring, by a processor, data indicating play events that are defined based on motions when a plurality of users play a sport and arranged in a time interval;
calculating, by the processor, a degree of correlation of plays of the plurality of users in the interval based on a temporal relation of the play events of the plurality of users; and
estimating, by the processor, a relation of the plurality of users in the interval based on the degree of correlation.

REFERENCE SIGNS LIST 10 system
100 sensor apparatus
110 sensor
120 processing section
200 smart phone
210 reception section
220 processing section
300 server
310 reception section
320 processing section
410 input processing section
411 time-series play event data
420 analysis processing section
421 re-sampling processing section
423 filtering processing section
425 time slot division processing section
427 degree-of-correlation calculating section
430 output processing section
431 relation estimation processing section
521 position determining section

The invention claimed is:
1. An analysis device, comprising:
a processor configured to:
acquire data that indicates a plurality of play events and position information of a place of occurrence of the plurality of play events, wherein
the plurality of play events is defined based on a plurality of motions associated with a plurality of users who plays a sport, and
the plurality of play events is arranged in a time interval;
determine a position of a first user of the plurality of users, wherein
the position of the first user is within a specific range from a position of a second user,
the position of the first user is determined based on the position information, and
the plurality of users includes the first user and the second user;
calculate a degree of correlation of a plurality of plays of the plurality of users in the time interval,
wherein the degree of correlation is calculated based on a temporal relation of the plurality of play events of the plurality of users and the determined position of the first user;
estimate a relation of the plurality of users in the time interval based on the degree of correlation; and
control a display screen to display the estimated relation of the plurality of users.

2. The analysis device according to claim 1,
wherein the processor is further configured to estimate that the plurality of users play together in the time interval.

3. The analysis device according to claim 2,
wherein the processor is further configured to estimate an interaction among the plurality of users in the time interval.

4. The analysis device according to claim 1,
wherein the processor is further configured to:
divide the time interval into a plurality of time slots; and
calculate the degree of correlation in each time slot of the plurality of time slots.

5. The analysis device according to claim 4,
wherein the processor is further configured to estimate an occurrence of an interaction among the plurality of users based on:
a length of each time slot of the plurality of time slots that is smaller than a first threshold value, and
the degree of correlation in each time slot of the plurality of time slots that is higher than a second threshold value.

6. The analysis device according to claim 1,
wherein the processor is further configured to:
  re-sample the acquired data based on a common time series; and
  calculate the degree of correlation based on the re-sampled data.

7. The analysis device according to claim 6,
wherein the processor is further configured to:
  filter the re-sampled data; and
  calculate the degree of correlation based on the filtered re-sampled data.

8. The analysis device according to claim 7,
wherein the processor is further configured to calculate the degree of correlation based on a moving average of the re-sampled data.

9. The analysis device according to claim 7,
wherein the processor is further configured to:
  remove a determined type of play event from the re-sampled data; and
  calculate the degree of correlation based on the removal.

10. The analysis device according to claim 6,
wherein the processor is further configured to:
  offset the re-sampled data; and
  calculate the degree of correlation based on the offset.

11. The analysis device according to claim 1,
wherein the processor is further configured to provide information to the plurality of users, and the information is based on the estimated relation.

12. The analysis device according to claim 11, wherein the processor is further configured to provide the information to the second user based on a request of the second user, and
the information indicates the first user of the plurality of users who plays together with the second user.

13. The analysis device according to claim 1,
wherein the processor is further configured to extract the first user from the plurality of users, and the first user serves as a calculation target of the degree of correlation.

14. The analysis device according to claim 13, wherein the processor is further configured to extract the first user that serves as the calculation target of the degree of correlation based on the position information.

15. A non-transitory computer-readable medium having stored thereon, computer-executable instructions which when executed by a processor cause the processor to execute operations, the operations comprising:
  acquiring data that indicates a plurality of play events and position information of a place of occurrence of the plurality of play events, wherein
    the plurality of play events is defined based on a plurality of motions associated with a plurality of users who plays a sport, and
    the plurality of play events is arranged in a time interval;
  determining a position of a first user of the plurality of users, wherein
    the position of the first user is within a specific range from a position of a second user,
    the position of the first user is determined based on the position information, and
    the plurality of users includes the first user and the second user;
  calculating a degree of correlation of a plurality of plays of the plurality of users in the time interval,
    wherein the degree of correlation is calculated based on a temporal relation of the play events of the plurality of users and the determined position of the first user;
  estimating a relation of the plurality of users in the time interval based on the degree of correlation; and
  controlling a display screen to display the estimated relation of the plurality of users.

16. An analysis method, comprising:
  acquiring, by a processor, data that indicates a plurality of play events and position information of a place of occurrence of the plurality of play events, wherein
    the plurality of play events is defined based on a plurality of motions associated with a plurality of users who plays a sport, and
    the plurality of play events is arranged in a time interval;
  determining, by the processor, a position of a first user of the plurality of users, wherein
    the position of the first user is within a specific range from a position of a second user,
    the position of the first user is determined based on the position information, and
    the plurality of users includes the first user and the second user;
  calculating, by the processor, a degree of correlation of a plurality of plays of the plurality of users in the time interval,
    wherein the degree of correlation is calculated based on a temporal relation of the play events of the plurality of users and the determined position of the first user;
  estimating, by the processor, a relation of the plurality of users in the time interval based on the degree of correlation; and
  controlling, by the processor, a display screen to display the estimated relation of the plurality of users.

* * * * *